United States Patent [19]

Hiraoka

[11] Patent Number: 5,589,554
[45] Date of Patent: Dec. 31, 1996

[54] ADHESIVE COMPOSITION AND PROCESS FOR PREPARING IT

[75] Inventor: Soichiro Hiraoka, Otsuki, Japan

[73] Assignee: Three Bond Co., Ltd., Japan

[21] Appl. No.: 307,235

[22] Filed: Sep. 16, 1994

[30] Foreign Application Priority Data

Sep. 17, 1993 [JP] Japan .................................. 5-253610

[51] Int. Cl.$^6$ .................................................. C08F 283/00
[52] U.S. Cl. .................... 525/530; 528/87; 528/112; 528/113; 528/297; 528/363; 528/366; 525/531; 525/532; 525/533; 558/443; 549/515; 549/521
[58] Field of Search .......................... 528/16, 87, 112, 528/297, 113, 363, 366; 525/530, 531, 532, 533; 558/443; 549/515, 521

[56] References Cited

U.S. PATENT DOCUMENTS

| | | | |
|---|---|---|---|
| 4,171,416 | 10/1979 | Motegi et al. | 526/245 |
| 4,377,490 | 3/1983 | Shiraishi | 252/188.3 R |
| 4,405,750 | 9/1983 | Nakata et al. | 524/717 |
| 4,622,414 | 11/1986 | McKervey | 560/61 |
| 4,837,260 | 6/1989 | Sato et al. | 524/261 |
| 5,175,337 | 12/1992 | Mikuni et al. | 558/443 |
| 5,290,838 | 3/1994 | Mikuni et al. | 524/157 |

FOREIGN PATENT DOCUMENTS

| | | |
|---|---|---|
| 4-1285 | 1/1962 | Japan . |
| 53-129231 | 11/1978 | Japan . |
| 54-152033 | 11/1979 | Japan . |
| 60-179482 | 9/1985 | Japan . |

*Primary Examiner*—Samuel A. Acquah
*Attorney, Agent, or Firm*—Ostrolenk, Faber, Gerb & Soffen, LLP

[57] ABSTRACT

An adhesive composition is here disclosed which comprises a 2-cyanoacrylate and at least one of compounds (a) and (b):

(a) an addition reaction product of an epoxy group and a compound having a cyano group and a carboxylic acid group in its molecule, and (b) a compound having a cyano group and a carboxylic acid group in its molecule. A process for preparing the adhesive composition is also disclosed herein. According to the present invention, the 2-cyanoacrylate-based adhesive composition can be obtained which is excellent in storage stability and hardening properties of thick films and which has a high hardening rate and remarkably improved surface hardening properties of the adhesive composition itself bulged from between adherends. Particularly, the 2-cyanoacrylate bulged from between the adherends can harden rapidly, so that the vaporization of the 2-cyanoacrylate can be minimized. Therefore, even if the adhesive composition does not have a specific ester group such as an alkoxyalkyl group, an irritant odor and whitening can be reduced.

20 Claims, No Drawings

ADHESIVE COMPOSITION AND PROCESS FOR PREPARING IT

BACKGROUND OF THE INVENTION (i) Field of the Invention

The present invention relates to a 2-cyanoacrylate-based adhesive composition which is excellent in storage stability and hardening properties of thick films and which has a high hardening rate and remarkably improved surface hardening properties of the adhesive composition itself bulged from between adherends, and it also relates to a process for preparing the 2-cyanoacrylate-based adhesive composition.

(ii) Description of the Prior Art

A 2-cyanoacrylate has been used as an adhesive which can instantaneously harden with the aid of a trace amount of moisture on the surfaces of adherends, and it is suitable for the adhesion of rubbers, plastics, lumber and the like.

The 2-cyanoacrylate-based adhesive composition closely sandwiched between the adherends can harden rapidly, but a part of the adhesive composition bulged from the adherends or exposed to air takes a long time to harden. In addition, the 2-cyanoacrylate vaporizes until the completion of the hardening, so that a user suffers a strong irritant odor, and the vaporized 2-cyanoacrylate hardens in the vicinity of the adherends to inconveniently whiten their peripheries.

As methods for most simply solving these problems, there are a method which comprises first applying a primer or a hardening accelerator comprising a basic substance onto the adherends, and then applying the 2-cyanoacrylate thereonto, and a method which comprises applying the hardening accelerator onto the bulged portion after the adhesion to rapidly complete the hardening of the bulged portion.

On the other hand, in order to inhibit the strong irritant odor and the whitening, a method has been employed which comprises introducing an alkoxyalkyl group or a long-chain alkyl group into an ester moiety of the 2-cyanoacrylate to restrain the vaporization of the 2-cyanoacrylate.

Furthermore, Japanese Patent Application Laid-open No. 1285/1992 suggests a method which comprises adding diethyl carbonate to the 2-cyanoacrylate to relieve the odor.

In addition, as the technique for improving a hardening rate, Japanese Patent Application Laid-open Nos. 152033/1979, 129231/1978 and 179482/1985 suggest methods which comprise adding polyethylene glycol, polypropylene glycol, crown ether or a calixarene compound.

However, any of the above-mentioned methods give poor storage stability, and they are not sufficiently satisfactory in points the hardening of the bulged portion, surface hardening properties and thick-film hardening properties.

That is to say, the method using the primer or the hardening accelerator can achieve (1) the surface hardening properties, (2) the thick-film hardening properties, (3) the decrease of the irritant odor and (4) the reduction of the whitening by the simplest procedure, but the one-pack type 2-cyanoacrylate-based adhesive composition becomes a two-pack type owing to the use of the primer or the hardening accelerator, so that the adhesive composition is difficult to handle and thus it is not practical.

In the method which comprises introducing the alkoxyalkyl group or the long-chain alkyl group into the ester moiety of the 2-cyanoacrylate in order to relieve the strong irritant odor and the whitening, the distillation temperature is raised at the time of the manufacture of the 2-cyanoacrylate. In consequence, the manufacture of the 2-cyanoacrylate is difficult and its storage stability is bad, and the cost increases inevitably because of the deterioration of yield.

Moreover, the method which comprises adding polyethylene glycol, crown ether or the calixarene compound can exert a sufficient effect for the improvement of the adhesion rate of the 2-cyanoacrylate closely sandwiched between the adherends, but this method inconveniently impairs the storage stability and cannot improve the hardening properties of the bulged portion, the surface hardening properties and the thick-film hardening properties.

Thus, it has been desired for a long time to develop the 2-cyanoacrylate-based adhesive which can remarkably accelerate the hardening of the bulged portion and which can minimize the irritant odor generated from the bulged portion and the whitening without introducing any specific ester group.

SUMMARY OF THE INVENTION

The present inventor has intensively researched with the intention of developing a 2-cyanoacrylate-based adhesive composition having the above-mentioned performance, and as a result, the present invention has now been completed.

An object of the present invention is to provide an adhesive composition which comprises a 2-cyanoacrylate and at least one compound selected from the group consisting of (a) an addition reaction product of an epoxy group and a compound having a cyano group and a carboxylic acid group in its molecule (hereinafter referred to as "cyano-containing carboxylic acid epoxy adduct") and (b) a compound having a cyano group and a carboxylic acid group in its molecule (hereinafter referred to as "cyano-containing carboxylic acid").

Another object of the present invention is to provide a process for preparing an adhesive composition which comprises adding, to a 2-cyanoacrylate, at least one of the following compounds (a) and (b):

(a) a cyano-containing carboxylic acid epoxy adduct, and (b) a cyano-containing carboxylic acid.

According to the present invention, through its mechanism is indefinite, surface hardening properties, quick-hardening properties and thick-film hardening properties of the adhesive composition can be remarkably improved by adding a cyanoacetic acid epoxy adduct or a cyano-containing carboxylic acid to the 2-cyanoacrylate, and the object of the present invention can be achieved.

DETAILED DESCRIPTION OF THE INVENTION

The 2-cyanoacrylate which can be used in the present invention includes all of usually usable esters, and typical examples of the 2-cyanoacrylate include 2-cyanoacrylates of methyl, ethyl, n-propyl, n-butyl, iso-butyl, sec-butyl, tert-butyl, amyl, n-hexyl, cyclohexyl, heptyl, n-octyl, 2-ethylhexyl, dodecyl, allyl, propargyl, benzyl, phenyl, methoxyethyl, ethoxyethyl, 2-chloroethyl, hexafluoroisopropyl, trifluoroethyl and 2-cyanoethyl.

A cyano-containing carboxylic acid epoxy adduct which can be used in the present invention can be represented as a compound containing at least one group having the formula ($A_1$) or ($A_2$)

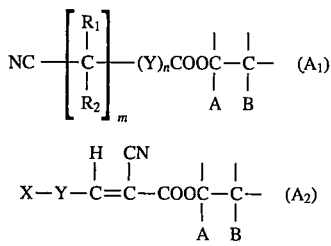

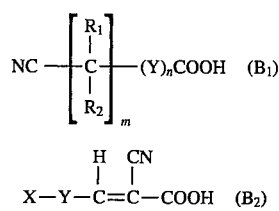

wherein each of $R_1$ and $R_2$ is a hydrogen atom, an alkyl group, an alkynyl group, an alkinyl group, a phenyl group or an allyl group; Y is an aromatic ring such as a benzene ring; X is a hydrogen atom, a hydroxyl group, an alkyl group, an alkenyl group, a phenyl group or an allyl group; A is a hydrogen atom and B is hydroxyl group, or A is a hydroxyl group and B is a hydrogen atom; and m and n are integers of 0 or more which meet the requirement of m+n>1, and the cyano-containing carboxylic acid epoxy adduct can be obtained by addition reaction of a cyano-containing carboxylic acid and an epoxy resin.

Typical examples of the usable epoxy resin include n-butyl glycidyl ether, allyl glycidyl ether, 2-ethylhexyl glycidyl ether styrene oxide, phenyl glycidyl ether, cresyl glycidyl ether, p-sec-butylphenyl glycidyl ether, glycidyl methacrylate, tert-carboxylic acid glycidyl ester (Cardura E), diglycidyl ether, (poly)ethylene glycol diglycidyl ether, (poly)propylene glycol diglycidyl ether, butanediol diglycidyl ether, trimethylolpropane triglycidyl ether, glycerin triglycidyl ether, Kadanol epoxide, bisphenol A diglycidyl ether, bisphenol F diglycidyl ether, bisphenol S diglycidyl ether, resorcinol diglycidyl ether, hexahydrobisphenol A diglycidyl ether, neopentyl glycol diglycidyl ether, phthalic acid diglycidyl ether, dimer acid diglycidyl ester, cresolnovolak polyglycidyl ether, phenolnovolak polyglycidyl ether, tetrabromobisphenol A diglycidyl ether, bisphenol hexafluoroacetone diglycidyl ether, polybutadiene epoxide, epoxidated soybean oil, 3,4-epoxy-6-methylcyclohexamethyl carboxylate, 3,4-epoxycyclohexylmethyl carboxylate, tetraphenyl glycidyl ether ethane and triphenyl glycidyl ether methane.

Among these compounds, examples of the epoxy resin suitable to obtain the cyano-containing carboxylic acid epoxy adduct which can be used in the present invention include polyethylene glycol diglycidyl ether, polypropylene glycol diglycidyl ether, n-butyl glycidyl ether, allyl glycidyl ether, 2-ethylhexyl glycidyl ether, phenyl glycidyl ether, glycidyl methacrylate, diglycidyl ether, bisphenol A diglycidyl ether, bisphenol F diglycidyl ether, hexahydrobisphenol A diglycidyl ether, 3,4-epoxy-6-methylcyclohexamethyl carboxylate and 3,4-epoxycyclohexylmethyl carboxylate which have a low viscosity at ordinary temperature.

Some kinds of epoxy resins are solid at ordinary temperature, or other kinds of epoxy resins become solid when reacted with a cyano-containing carboxylic acid such as cyanoacetic acid. However, when each of these solid epoxy resins is diluted with a plasticizer such as dioctyl phthalate, dibutyl phthalate or a phosphate, or an organic solvent such as toluene, xylene, acetone or MIBK, the liquid cyano-containing carboxylic acid epoxy adduct can be obtained.

On the other hand, the cyano-containing carboxylic acid which can be used in the present invention is a compound represented by the formula ($B_1$) or ($B_2$)

wherein each of $R_1$ and $R_2$ is a hydrogen atom, an alkyl group, an alkenyl group, an alkynyl group, a phenyl group or an allyl group; Y is an aromatic ring such as a benzene ring; X is a hydrogen atom, a hydroxyl group, an alkyl group, an alkenyl group, a phenyl group or an allyl group; m and n are integers of 0 or more which meet the requirement of m+n>1.

Typical examples of the cyano-containing carboxylic acid include cyanoacetic acid, m-cyanobenzoic acid, p-cyanobenzoic acid, α-cyanocinnamic acid, 2-cyano-3,3-diphenylacrylic acid, α-cyano-3-hydroxycinnamic acid, α-cyano-4-hydroxycinnamic acid and 3-(1-cyanoethyl)benzoic acid.

When this cyano-containing carboxylic acid is mixed with the above-mentioned epoxy resin and the resultant mixture is then heated up to 50° to 150° C., an addition reaction occurs between a carboxyl group of the cyano-containing carboxylic acid and a glycidyl group of the epoxy resin to easily obtain the cyano-containing carboxylic acid epoxy adduct which can be used in the present invention.

The thus obtained cyano-containing carboxylic acid epoxy adduct characteristically imparts, to the 2-cyanoacrylate, the improvement of hardening properties, quick-hardening properties and surface hardening properties of a remarkably bulged portion of an adhesive.

In order to acquire the above-mentioned characteristics, the amount of the cyano-containing carboxylic acid epoxy adduct to be added is preferably in the range of 0.001 to 10 parts by weight, more preferably 0.001 to 5 parts by weight based on 100 parts by weight of the 2-cyanoacrylate. If the amount of the cyano-containing carboxylic acid epoxy adduct is more than 10 parts by weight, it is difficult to secure stability as the one-pack type adhesive.

The cyano-containing carboxylic acid is an acidic substance represented by the above-mentioned molecular formula, and so if this cyano-containing carboxylic acid is added to the 2-cyanoacrylate, it can be presumed that a hardening rate is noticeably low and hence a role as the instantaneous adhesive can scarcely be played. In fact, when the 2-cyanoacrylate-based adhesive composition containing a large amount of the cyano-containing carboxylic acid with respect to the cyano-containing carboxylic acid epoxy adduct was dropped on the surface of the metal and a time which was required for surface hardening was measured, it was confirmed that a longer time was taken than in a case where a large amount of the cyano-containing carboxylic acid epoxy adduct was contained therein.

However, it has been unexpectedly found that, when dropped on a rubber, particularly, acrylonitrile-butadiene rubber, the 2-cyanoacrylate-based adhesive composition containing a predominant amount of the cyano-containing carboxylic acid can remarkably accelerate the surface hardening, though its mechanism is not definite.

Thus, even if the cyano-containing carboxylic acid alone or a combination of the cyano-containing carboxylic acid and the cyano-containing carboxylic acid epoxy adduct is added to the 2-cyanoacrylate, the adhesive composition suitable for the object of the present invention can be constituted.

In this case, the amount of the cyano-containing carboxylic acid is preferably in the range of 0.001 to 5 parts by weight, more preferably 0.005 to 2.0 parts by weight based on 100 parts by weight of the 2-cyanoacrylate. If the amount of the cyano-containing carboxylic acid is less than 0.001 part by weight, the sufficient surface hardening properties cannot be obtained, and if it is more than 5 parts by weight, the hardening rate until an initial adhesion is very slow, and the corrosion of metal such as iron increases inconveniently.

In general, a stabilizer, a thickener, a plasticizer, a crosslinking agent or the like are added to the 2-cyanoacrylate adhesive, and also in the present invention, these additives may be added thereto. Examples of the stabilizer include $SO_2$, a sulfonic acid, sultone, lactone, boron fluoride, hydroquinone, hydroquinone monomethyl ether, catechol and pyrogallol, and the amount of this stabilizer is in the range of 1 to 1,000 ppm.

In an case that the adhesive having a high viscosity is required, several percent of poly(methyl methacrylate), poly(2-cyanoacrylate), acrylic rubber, acrylonitrile-butadiene rubber or polyurethane elastomer can be added to the adhesive, thereby obtaining a high viscosity.

Furthermore, by adding fumed silica to the adhesive, thixoptropic properties can be imparted thereto, so that the adhesive does not flow on a vertical surface and the improvement of workability can be attained.

The adhesive composition obtained by the present invention is suitable for the adhesion of metals such as iron, stainless steel, copper, brass, aluminum, zinc, tin and ferrite, plastics such as polycarbonates, polystyrene and Bakelites, and rubbers such as NBR, SBR, CR, NR and EPDM. When these materials are bonded to each other, a bulged portion hardens rapidly, so that an irritant odor generated during hardening after the bonding and whitening can be minimized.

According to the present invention, a 2-cyanoacrylate-based adhesive composition can be obtained which is excellent in storage stability and hardening properties of thick films and which has a high hardening rate and remarkably improved surface hardening properties of the adhesive composition itself bulged from between adherends.

Furthermore, in the present invention, the 2-cyanoacrylate bulged from between the adherends can harden rapidly, so that the vaporization of the 2-cyanoacrylate can be minimized. Therefore, even if the adhesive composition does not have a specific ester group such as an alkoxyalkyl group, an irritant odor and whitening can be reduced.

Since the whitening during the hardening of the adhesive can be inhibited, the labor of wiping out the whitened adhesive can be omitted and the improvement of yield can be realized. Thus, the 2-cyanoacrylate-based adhesive composition of the present invention can be utilized as the adhesive in many industrial fields of electricity, machine, electron, transport and the like, and as the domestic adhesive. Therefore, the utility value of the present invention is extremely high.

Since the surface hardening properties of the applied adhesive can be outstandingly improved, hardening time can be shortened, and in the case that the adhesive of the present invention is used for the adhesion of metals, rubbers, plastics and lumber, it is not necessary any more to wait the hardening of the bulged portion of the adhesive for a long time, and a next step can be promptly set about.

In addition, the adhesive composition is excellent in thick-film hardening properties, and hence adhesion between the adherends having some clearance can also be achieved quickly. Simultaneously, the application of the adhesive composition to a potting medium and a coating agent is also sufficiently possible.

Now, the present invention will be described in more detail with reference to examples and comparative examples. It should be noted that the scope of the present invention is not limited to these examples.

EXAMPLE 1

In a beaker was placed 42.5 g of a bisphenol A epoxy resin (EP 828), and 21.0 g of cyanoacetic acid was then added thereto. Next, the temperature of the solution was slowly raised up to 50° C. with stirring. At this time, reaction began, and the solution temperature rose up to 110° C. After stirred at 70° C. for 2 hours, the solution was slowly cooled to obtain an amber solid. Next, 10 g of methyl ethyl ketone was added thereto, and the solution was then allowed to stand for about 1 hour, thereby obtaining a light-yellow liquid cyanoacetic acid epoxy adduct (I).

A suitable amount of this compound was added with stirring to a commercially available 2-cyanoacrylate-based adhesive containing 0.1% of hydroquinone and a trace amount of boron trifluoride (trade name Three Bond 1741) based on the weight of the 2-cyanoacrylate, and it was then dissolved at ordinary temperature to prepare a product of Example 1.

EXAMPLE 2

In a beaker was placed 50 g of polypropylene glycidyl ether (trade name P-400), and 25 g of cyanoacetic acid was then added thereto. Next, the temperature of the solution was slowly raised up to 50° C. with stirring. Immediately, an addition reaction began, and the solution temperature rose up to 95° C. The solution was then stirred at 70° C. for 2 hours to obtain a light-yellow liquid cyano-acetic acid epoxy adduct (II). Afterward, the same procedure as in Example 1 was carried out to prepare a product of Example 2.

EXAMPLE 3

In a beaker was placed 26 g of butyl glycidyl ether (BG), and 17 g of cyanoacetic acid was then added thereto. Afterward, the same procedure as in Example 2 was effected to obtain a cyanoacetic acid epoxy adduct (III). Next, the same procedure as in Example 1 was carried out to prepare products (1) and (2) of Example 3.

EXAMPLE 4

Each suitable amount of cyanoacetic acid was added to Three Bond 1741, and the solution was then stirred at ordinary temperature to dissolve cyanoacetic acid therein, thereby preparing products (1) to (4) of Example 4.

EXAMPLE 5

A cyanoacetic acid epoxy adduct obtained in Example 2 and cyanoacetic acid were added to a suitable amount of Three Bond 1741 with stirring to prepare a product of Example 5.

EXAMPLE 6

Suitable amounts of p-cyanobenzoic acid and α-cyanocinnamic acid were added to Three Bond 1741 to prepare a product of Example 6.

COMPARATIVE EXAMPLE 1

Three Bond 1741 was regarded as a product of Comparative Example 1.

COMPARATIVE EXAMPLE 2

A suitable amount of an epoxy resin which was used in Examples 1 to 3 was added to Three Bond 1741, followed by stirring, to prepare a product of Comparative Example 2.

COMPARATIVE EXAMPLE 3

A suitable amount of each of polyethylene glycol and crown ether was added to Three Bond 1741 to prepare products (1) and (2) of Comparative Example 3.

COMPARATIVE EXAMPLE 4

A suitable amount of acetic acid was added to Three Bond 1741, followed by stirring, to prepare a product of Comparative Example 4.

For the products of the above-mentioned examples and comparative examples, the following items were measured to confirm the usefulness of the present invention:

(1) A surface hardening time in the case that each product was dropped on each of steel and acrylonitrile-butadiene rubber.

(2) The observation of a surface hardening state in the case that each product was dropped on each of the steel and the acrylonitrile-butadiene rubber.

(3) The observation of a whitening degree.

(4) Storage stability at 70° C.

(5) An initial hardening time (between steel plates).

(6) Adhesive strength between steel plates.

The results are shown in Tables 1, 2, 3 and 4.

TABLE 1

|  | Ex. 1 | Ex. 2 | Example 3 (1) | Example 3 (2) |
|---|---|---|---|---|
| Three Bond 1741 (g) | 100 | 100 | 100 | 100 |
| Cyanoacetic acid epoxy adduct EP828 Adduct/MEK (g) | 0.3 |  |  |  |
| n-butyl glycidyl ether adduct (g) |  |  | 0.1 | 0.6 |
| P-400 adduct (g) |  | 0.5 |  |  |
| Surface hardening time |  |  |  |  |
| (Steel) (min) | 32 | 14 | 54 | 31 |
| (NBR) (min) | 39 | 19 | 38 | 41 |
| Surface hardening state |  |  |  |  |
| (Steel) (min) | ○ | ◎ | ○ | ◎ |
| (NBR) (min) | ○ | ◎ | ◎ | ◎ |
| Whitening degree (Steel plate) | ○ | ○ | ○ | ○ |
| Storage stability at 70° C. (days) | >7 | >7 | >7 | >7 |
| Initial hardening time (Steel plate) (sec) | 5 | 10 | 10 | 10 |
| Adhesive strength (Steel) (Kgf/cm²) | 112 | 152 | 137 | 130 |

TABLE 2

|  | Example 4 (1) | Example 4 (2) | Example 4 (3) | Example 4 (4) | Ex. 5 |
|---|---|---|---|---|---|
| Three Bond 1741 (g) | 100 | 100 | 100 | 100 | 100 |
| Cyanoacetic acid epoxy adduct (P-400) (g) |  |  |  |  | 0.3 |
| Canoacetic acid (g) | 0.005 | 0.06 | 0.2 | 0.4 | 0.04 |
| Surface hardening time |  |  |  |  |  |
| (Steel) (min) | 49 | 37 | 41 | 53 | 22 |
| (NBR) (min) | 36 | 10 | 18 | 23 | 13 |
| Surface hardening state |  |  |  |  |  |
| (Steel) (min) | ○ | ◎ | ◎ | ◎ | ◎ |
| (NBR) (min) | ○ | ◎ | ◎ | ◎ | ◎ |
| Whitening degree (Steel plate) | ○ | ○ | ○ | ○ | ○ |
| Storage stability at 70° C. (days) | >7 | >7 | >7 | >7 | >7 |
| Initial hardening time (Steel plate) (sec) | 10 | 20 | 30 | 60 | 20 |
| Adhesive strength (Steel) (Kgf/cm²) | 132 | 178 | 170 | 142 | 153 |

TABLE 3

|  | Example 6 (1) | Example 6 (2) | Example 6 (3) | Example 6 (4) |
|---|---|---|---|---|
| Three Bond 1741 (g) | 100 | 100 | 100 | 100 |
| p-cyanobenzoic acid (g) | 0.005 | 0.1 | 0.6 |  |
| p-cyanocinnamic acid (g) |  |  |  | 0.4 |
| Surface hardening time |  |  |  |  |
| (Steel) (min) | 42 | 14 | 12 | 20 |
| (NBR) (min) | 54 | 41 | 12 | 10 |
| Surface hardening state |  |  |  |  |
| (Steel) (min) | ○ | ◎ | ◎ | ◎ |
| (NBR) (min) | ○ | ◎ | ◎ | ◎ |
| Whitening degree (Steel plate) | ○ | ○ | ○ | ○ |
| Storage stability at 70° C. (days) | >7 | >7 | >7 | >7 |
| Initial hardening time (Steel plate) (sec) | 5 | 10 | 15 | 20 |
| Adhesive strength (Steel) (Kgf/cm²) | 115 | 125 | 130 | 120 |

TABLE 4

|  | Comp. Ex. 1 | Comp. Ex. 2 | Comp. Ex. 3 (1) | Comp. Ex. 3 (2) | Comp. Ex. 4 |
|---|---|---|---|---|---|
| Three Bond 1741 (g) | 100 | 100 | 100 | 100 | 100 |
| Epoxy resin (P-400) (g) |  | 0.5 |  |  |  |
| Polyethylene glycol (400) (g) |  |  | 0.5 |  |  |
| Crown ether (g) |  |  |  | 0.3 |  |
| Acetic acid (g) |  |  |  |  | 0.2 |
| Surface hardening time |  |  |  |  |  |
| (Steel) (min) | 46 | 83 | 46 | 61 | 56 |
| (NBR) (min) | 61 | 80 | 60 | 59 | 44 |
| Surface hardening state |  |  |  |  |  |
| (Steel) (min) | X | X | X | X | Δ |
| (NBR) (min) | X | X | X | X | Δ |
| Whitening degree | — | X | X | X | X |

TABLE 4-continued

|  | Comp. Ex. 1 | Comp. Ex. 2 | Comp. Ex. 3 (1) | Comp. Ex. 3 (2) | Comp. Ex. 4 |
|---|---|---|---|---|---|
| (Steel plate) Storage stability at 70° C. (days) | >7 | <1 | 5 | 6 | >7 |
| Initial hardening time (Steel plate) (sec) | 10 | 5 | 5 | 5 | 10 |
| Adhesive strength (Steel) (Kgf/cm²) | 120 | 109 | 104 | 95 | 136 |
| Note | * | * | * | * |  |

*Noticeable wrinkles were observed on the surface.

Surface hardening time:
About 0.006 g of each product was dropped on each surface of a steel plate and NBR by the use of a micropipette, and the time until the tack of the product on the surface was lost in an atmosphere at 25° C. and 55% was measured (average of n=3).

| Surface hardening state: | |
|---|---|
| Lustrous surface state | ⊚ |
| Slightly cloudy but good surface hardening state | ○ |
| Opaque hardening state | △ |
| Lusterless opaque nonuniform surface sate | X |
| Whitening degree: | |
| Less than Three Bond 1741 | ○ |
| Equal to Three Bond 1741 | △ |
| More than Three Bond 1741 | X |

Storage stability at 70° C.:
Days until the occurrence of gelation or noticeable viscosity increase.

What is claimed is:

1. An adhesive composition which comprises a 2-cyanoacrylate and at least one of the following compounds (a) and (b):
   (a) an adduct of an epoxy group and a cyano-containing carboxylic acid, and
   (b) a cyano-containing carboxylic acid.

2. The adhesive composition according to claim 1 wherein the adduct (a) is a compound represented by the formula $(A_1)$ or $(A_2)$

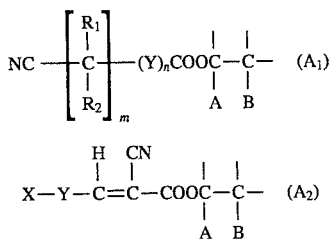

wherein each of $R_1$ and $R_2$ is a hydrogen atom, an alkyl group, an alkenyl group, an alkynyl group, a phenyl group or an allyl group; Y is an aromatic ring; X is a hydrogen atom, a hydroxyl group, an alkyl group, an alkenyl group, a phenyl group or an allyl group; A is a hydrogen atom and B is a hydroxyl group, or A is a hydroxyl group and B is a hydrogen atom; m and n are integers of 0 or more which meet the requirement of m+n>1; and the undefined valences constitute the remainder of the epoxy resin whose ring opening resulted in the A and B groups.

3. The adhesive composition according to claim 1 wherein the acid (b) is a compound represented by the formula $(B_1)$ or $(B_2)$

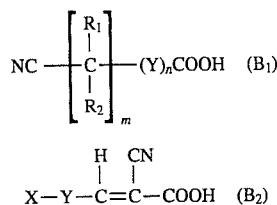

wherein each of $R_1$ and $R_2$ is a hydrogen atom, an alkyl group, an alkenyl group, an alkynyl group, a phenyl group or an allyl group; Y is an aromatic ring; X is a hydrogen atom, a hydroxyl group, an alkyl group, an alkenyl group, a phenyl group or an allyl group; and m and n are integers of 0 or more which meet the requirement m+n>1.

4. The adhesive composition according to claim 1 wherein the adduct (a) is an epoxy adduct of cyanoacetic acid, m-cyanobenzoic acid, p-cyanobenzoic acid, α-cyanocinnamic acid, 2-cyano-3,3-diphenylacrylic acid, α-cyano-3-hydroxycinnamic acid, α-cyano-4-hydroxycinnamic acid or 3-(1-cyanoethyl)benzoic acid.

5. The adhesive composition according to claim 1 wherein the acid (b) is cyanoacetic acid, m-cyanobenzoic acid, p-cyanobenzoic acid, α-cyanocinnamic acid, 2-cyano-3,3-diphenylacrylic acid, α-cyano-3-hydroxycinnamic acid, α-cyano-4-hydroxycinnamic acid or 3-(1cyanoethyl)benzoic acid.

6. The adhesive composition according to claim 1 wherein the amount of the adduct (a) is in the range of 0.001 to 10 parts by weight based on 100 parts by weight of the 2-cyanoacrylate.

7. The adhesive composition according to claim 1 wherein the amount of the acid (b) is in the range of 0.001 to 5 parts by weight based on 100 parts by weight of the 2-cyanoacrylate.

8. The adhesive composition according to claim 4 wherein the amount of the adduct (a) is in the range of 0.001 to 10 parts by weight based on 100 parts by weight of the 2-cyanoacrylate.

9. The adhesive composition according to claim 8 wherein the adduct (a) is an adduct of cyanoacetic acid and bisphenol-A, polypropylene glycidyl ether or butyl glycidyl ether.

10. The adhesive composition according to claim 9 wherein the amount of the adduct is up to 5 parts by weight based on 100 parts by weight of the 2-cyanoacrylate.

11. The adhesive composition according to claim 5 wherein the amount of acid (b) is in the range of 0.001 to 10 parts by weight based on 100 parts by weight of the 2-cyanoacrylate.

12. The adhesive composition according to claim 11 wherein the acid is cyanoacetic acid, cyanobenzoic acid, cyanocinnamic acid or a mixture thereof.

13. The adhesive composition according to claim 12 wherein the amount of the acid (b) is in a range of 0.005 to 2 parts by weight based on 100 parts by weight of the 2-cyanoacrylate.

14. A process for preparing an adhesive composition which comprises adding, to a 2-cyanoacrylate, at least one of the following compounds (a) and (b):
   (a) an adduct of an epoxy group and a compound having a cyano group and a carboxylic acid group in its molecule, and
   (b) a containing cyano group and a carboxylic acid.

15. The process for preparing an adhesive composition according to claim 14 wherein the adduct (a) is a compound containing at least one group represented by the formula $(A_1)$ or $(A_2)$

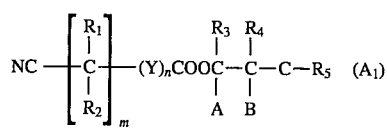

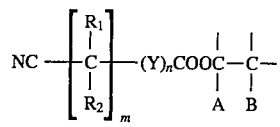

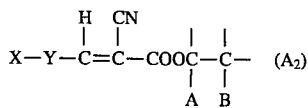

wherein each of $R_1$ and $R_2$ is a hydrogen atom, an alkyl group, an alkenyl group, an alkynyl group, a phenyl group or an allyl group; Y is an aromatic ring; X is a hydrogen atom, a hydroxyl group, an alkyl group, an alkenyl group, a phenyl group or an allyl group; A is a hydrogen atom and B is a hydroxyl group, or A is a hydroxyl group and B is a hydrogen atom; m and n are integers of 0 or more which meet the requirement of m+n>1; and the undefined valences constitute the remainder of the epoxy resin whose ring opening resulted in the A and B groups.

16. The adhesive composition according to claim 14 wherein the acid (b) is a compound represented by the formula $(B_1)$ or $(B_2)$

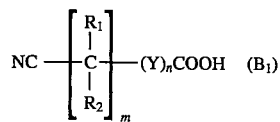

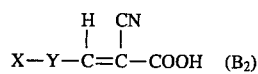

wherein each of $R_1$ and $R_2$ is a hydrogen atom, an alkyl group, an alkenyl group, an alkynyl group, a phenyl group or an allyl group; Y is an aromatic ring; X is a hydrogen atom, a hydroxyl group, an alkyl group, an alkenyl group, a phenyl group or an allyl group; and m and n are integers of 0 or more which meet the requirement m+n>1.

17. The process for preparing an adhesive composition according to claim 14 wherein the adduct is an epoxy adduct of cyanoacetic acid, m-cyanobenzoic acid, p-cyanobenzoic acid, α-cyanocinnamic acid, 2-cyano-3,3-diphenylacrylic acid, α-cyano-3-hydroxycinnamic acid, α-cyano-4-hydroxycinnamic acid or 3-(1-cyanoethyl)benzoic acid.

18. The process for preparing an adhesive composition according to claim 14 wherein the acid (b) is cyanoacetic acid, m-cyanobenzoic acid, p-cyanobenzoic acid, α-cyanocinnamic acid, 2-cyano-3,3-diphenylacrylic acid, α-cyano-3-hydroxycinnamic acid, α-cyano-4-hydroxycinnamic acid or 3-(1-cyanoethyl)benzoic acid.

19. The process for preparing an adhesive composition according to claim 14 wherein the amount of the adduct is in the range of 0.001 to 10 parts by weight based on 100 parts by weight of the 2-cyanoacrylate.

20. The process for preparing an adhesive composition according to claim 14 wherein the amount of the acid (b) is in the range of 0.001 to 5 parts by weight based on 100 parts by weight of the 2-cyanoacrylate.

* * * * *